United States Patent
Mishra et al.

(10) Patent No.: US 6,908,599 B2
(45) Date of Patent: Jun. 21, 2005

(54) PROCESS FOR THE PRODUCTION OF ZIRCONIUM BORIDE POWDER

(75) Inventors: Suman Kumari Mishra, Jamshedpur (IN); Samar Das, Jamshedpur (IN); Rajendra Prakash Goel, Jamshedpur (IN); Patcha Ramachandra Rao, Jamshedpur (IN)

(73) Assignee: Council of Scientific and Industrial Research, New Delhi (IN)

( * ) Notice: Subject to any disclaimer, the term of this patent is extended or adjusted under 35 U.S.C. 154(b) by 260 days.

(21) Appl. No.: 10/393,398

(22) Filed: Mar. 20, 2003

(65) Prior Publication Data

US 2004/0022712 A1 Feb. 5, 2004

(30) Foreign Application Priority Data

Mar. 28, 2002 (IN) ................. PCT/IN02/00082

(51) Int. Cl.⁷ .............................. C01B 35/04
(52) U.S. Cl. ....................... 423/297; 423/639
(58) Field of Search ................ 423/297, 639

(56) References Cited

U.S. PATENT DOCUMENTS

| | | | | |
|---|---|---|---|---|
| 3,088,805 A | * | 5/1963 | Cotter et al. ................. | 423/297 |
| 4,414,188 A | * | 11/1983 | Becker ........................ | 423/297 |
| 4,503,021 A | * | 3/1985 | Brynestad et al. .......... | 423/297 |
| 5,169,832 A | * | 12/1992 | Khazai et al. ................ | 501/87 |
| 5,587,140 A | * | 12/1996 | Fujiwara et al. ............ | 423/297 |
| 2004/0126299 A1 | * | 7/2004 | Ovrebø et al. .............. | 423/297 |

FOREIGN PATENT DOCUMENTS

WO            9103423 A        3/1991

OTHER PUBLICATIONS

Database WPI Section CH, Week 200215 Derwent Publications LTD., London, GB; Class E32, AN 2002–106847 XP002222622 & CN 1317519A (China . . . Inst), Oct. 17, 2001.

Database WPI Setion CH, Week 198831 Derwent Publications LTD., London, GB; Class E37, AN 1988–215165 XP002222623 & JP 63095113A (Kawasaki . . . Corp), Apr. 26, 1988.

Database CA Online! Chemical Abstracts Service, Columbus, Ohio, US; Wusirika, Raja R.: "Boride Powder", Retrieve from STN Database Accession No. 106:8664 CA.

Maron F.S. et Germaidze M.S.: "New Method . . . Boride"; Journal of Applied Chemistry of USSR, vol. 43, No. 8, Aug. 1970, pp. 1837–1838, XP008011308 p. 1838.

* cited by examiner

*Primary Examiner*—Wayne A. Langel
(74) *Attorney, Agent, or Firm*—Ladas & Parry LLP

(57) ABSTRACT

The present invention provides an improved process for the manufacture of zirconium boride by reacting boric acid, a Zirconium compound and magnesium and leaching the resulting product mixture to obtain zirconium boride with high purity.

6 Claims, No Drawings

PROCESS FOR THE PRODUCTION OF ZIRCONIUM BORIDE POWDER

FIELD OF THE INVENTION

The present invention relates to an improved process for the production of Zirconium Boride Powder.

BACKGROUND OF THE INVENTION

Zirconium boride/diboride is emerging as a potential advanced ceramic because of it's excellent properties—high melting point, hardness, elastic modulus and electrical conductivity, resistance to acids like HCL, HF and other non-ferrous metals, cryolite and non-basic slags. Due to these properties, $ZrB_2$ finds several engineering applications like cathodes for electrochemical processing of aluminum (Hall-Heroult process), evaporation boats, crucibles for handling molten metals, thermowells, wear parts, nozzles, armor and as dispersoid in metal and ceramic composites for getting improved mechanical properties, cutting tools etc. It is also used as thermocouple sieves for high temperature furnaces.

Zirconium Boride due to its several technological important uses, as stated above, has been synthesized in the prior art in several ways:
1. Synthesis from elements by melting, sintering or hot pressing in the process.

Zirconium and boron metal ingots are melted together in inert atmosphere in furnace to obtain a final product in the form of lumps of zirconium boride. Metallurgical processes such as forging, milling are used to obtain fine powder of zirconium boride. The process uses raw material in elemental form. Therefore different powder metallurgy processing methods are required for converting from elemental to powder form. Thus the process becomes very costly and so commercially may not be viable.

2. Borothermic reduction of metal oxides

In this method, zirconium oxide is reduced using boron metal powder in furnace under inert atmosphere, represented by the following equation.

$$ZrO_2 + 2B = ZrB_2 + O_2$$

The use of pure boron in the process makes it costly. Another disadvantage is that the efficiency of conversion is generally not very high.

3. Another known process uses carbothermic reduction of metal-oxides and boric oxide to produce zirconium boride powder and can be represented by the following equation $$ZrO_2 + B_2O_3 + 5C = ZrB_2 + 5CO$$

4. In another know process, reduction of the metal oxide is done with carbon or Boron carbide, the reaction being represented by the equation.

$$2ZrO_2 + B_4C + 3C = 2ZrB_2 + 4CO$$

The above mentioned processes 3 and 4, generally do not result to pure $ZrB_2$ powder. Also reduction of $ZrO_2$ by boron carbide and carbon requires very high temperature furnaces in the range of about 2000 to 2200° C., which makes the process costly and much more time consuming.

5. Another known process is aluminothermic, magnetiothermic and ilicothermic reduction of metal oxide—Boric Oxide mixture to produce zirconium boride powder.

In this process, mixture of oxides of zirconium and boron is coeduced using low melting metal powders of aluminum, magnesium or silicon in furnace, which is represented by the following equation $$ZrO_2 + B_2O_3 + 5Mg = ZrB_2 + 5MgO$$

Here though the reduction is done at relatively low temperature, but for high purity products further treatment at higher temperature is required. Also since zirconium oxide is a very stable oxide due to its low free energy it is difficult to reduce it completely without going to high temperature and hence the final product usually retains some amount of $ZrO_2$ with zirconium boride and magnesium oxide or other metal oxide. It is difficult to remove $ZrO_2$ with etchants because etchants which can dissolve $ZrO_2$ also dissolve zirconium boride. Hence zirconium boride also pass into the solution.

6. Self propagating high temperature synthesis (SHS) synthesis of Zirconium boride by elemental powder.

The SHS process is in exploitation of a highly exothermic and usually very rapid chemical reaction to form an useful material. The central feature of the process is that the heat required to drive the chemical reaction is supplied from the reaction itself. The potential commercial attractiveness of the SHS derives from the expected lower capital and operating costs. The SHS has found applications in recent year for preparing intermetallics and advanced high temperature materials such as carbides, borides, slicides and nitrides (A. G. Mershanov and I. P. borovinskaya, Combat. Sci. Technol. 10, 195 (1975), I. M. Sheppard, Adv. Mater. Proce, 25, (1986). Applications, advantages, fundamental and technological aspects of SHS have been reviewed in literature [Z. A. Munir, Meatall, Trans. A, 23A, 7 (1992), A Makino, C. K. Low, J. Amer, Corm. Soc. 77(3), 778 (1994). This technique has inherent advantages over conventional methods, which require high temperature furnaces and longer processing times. Materials produced by the SHS method have advantages such as high purity of product [B. Manaly, J. P. Holt and Z. A. Munir, mat. Sci. Res., 16. 303 (1984), low energy requirements and relatives simplicity of the process (H. C. Yi and J. J. Moore, J. Mat, Sci., 25, 1150 (1990)]. Owing to the high cooling rate, high defect concentrations and non-equilibrium structures exist in the SHS produced materials, resulting in more reactive metastable and thus more sinterable products [O. R. Bermann and J. Barrington, J. Amer. Cerm. Soc., 49, 502 (1966).

In the SHS of zirconium boride, zirconium and boron metal powders are mixed together and ignited from top. The ignition source is switched off as the surface reaches the required ignition temperature. The combustion wave now propagates throughout the sample. Reaction rates has been calculated as 25 centimeter per second as reported in literature.

Even though the SHS process has advantages but use of element powder makes the process cost incentive.

Hence it is observed that in all the above known processes, the time requirement is more and also it requires high temperature furnace in the range of 2000 to 2200° C. to achieve 99% and above pure products or it does require pure elemental powders as starting raw material which make the process costly.

OBJECTS OF THE INVENTION

The main object of the invention is to provide an improved process for the production of pure zirconium boride powder.

Another object of the invention is to provide an improved process for the production of zirconium powder which is cost effective, fast and energy efficient.

Yet another object of the invention is to provide a process which makes use of self-propagating high temperature synthesis where the starting materials are zirconium chloride and boric acid.

Still another object of the invention is to synthesize pure single phasic zirconium diboride where no other peaks are detected through XRD, at room temperature without using any high temperature furnaces at a low processing time.

SUMMARY OF THE INVENTION

Accordingly, the present invention provides an improved process for the production of zirconium boride, which comprises mixing powders of zirconium chloride in the range of 20–25% wt, Boric acid ($H_3BO_3$) in the range of 35–44 wt % and small cut turnings Magnesium (Mg) in the range of 33–40 wt % and pelletising the mixture so prepared, igniting the prepared pellets under inert atmosphere and leaching the resultant product ($ZrB_2$ and MgO) with leachant to obtain zirconium boride.

In one embodiment of the invention, zirconium chloride and boric acid are milled prior to mixing.

In another embodiment of the invention, the resulting mixture after ignition is leached with a leachant comprising phosphoric acid.

In another embodiment of the invention., the zirconium chloride, boric acid and magnesium used as raw materials are of commercial grade.

In another embodiment of the invention, the reaction time is in the range of 1 to 2 minutes.

In another embodiment of the invention., the product zirconium boride is of purity of 95% and above.

DETAILED DESCRIPTION OF THE INVENTION

In the process of present invention, due to reaction between boric acid, Zirconium compound and magnesium, the temperature rises and as soon they are reduced to metal further rise of temperature takes place of the order of 2500° C. due to the reaction between zirconium and boron. Since zirconium chloride can be reduced at much lower temperature compared to zirconium oxide owing to higher free energy of zirconium chloride at reaction front, the product is free from $ZrO_2$. The product has only $ZrB_2$ and MgO. MgO is further selectively leached out using suitable leachant such as ortho phosphoric acid and the like. The processing time is also less to the range of 1–2 minute.

By the process of present invention more then 95% purity of zirconium boride is produced using zirconium chloride, boric acid and magnesium turning. The invention takes much lesser time compared to other available known processes.

The following examples are given by way, of illustrations and should not be construed to limit the scope of the invention

EXAMPLE 1

$ZrCl_4$=2 gms
Mg=3.5 gms
$H_3BO_3$=4 gms

The above-mentioned materials were milled for proper mixing. The mixture was pelletised into 15 mm die cylinder of height 25 mm. Pellets were kept in a reaction chamber, in argon atmosphere in a graphite crucible. Pellets were arc ignited using graphite electrode. The reaction was complete in 30 seconds. Product was leached with 20% strength phosphoric acid solution in water.

Result: It was found that product has $ZrB_2$ as main phase. MgO, $Mg_3(BO_3)_2$ and Magnesium boride were also present in the product. After leaching product has $ZrB_2$ and magnesium boride. So an attempt was made to reduce Mg and boric acid to some extent. Hence other amounts (Lesser amounts of Mg and $H_3BO_3$ were also tried.)

EXAMPLE 2

$ZrCl_4$=2 gms
Mg=3 gms
$H_3BO_3$=3.5 gms

All the above materials were milled for proper mixing The mixture was pelletised into 15 mm diameter cylinder of height 25 mm. Pellets were kept in a reaction chamber in argon atmosphere in a graphite crucible. Pellets were arc ignited using graphite electrode. The reaction was complete in 30 seconds. Product was leached with 20% strength phosphoric acid solution in water.

Result: Here the amounts of Mg and boric acid was varied. It was found that quality of the product improved with $ZrB_2$ as main phase and MgO, $Mg_3(BO_3)_2$ and Magnesium boride were also present in the product. After leaching product has $ZrB_2$ and still some magnesium boride, so we felt that Mg and boric acid should be further reduced to some extent. Hence other amounts of Mg and $H_3BO_3$ were also tried.

EXAMPLE 3

$ZrCl_4$=2 gms
Mg=3 gms
$H_3BO_3$=3 gms

All above materials were milled for four hours for proper mixing. The mixture was pelletised into 15 mm diameter cylinder of height 25 mm. Pellets were kept in a reaction chamber in argon atmosphere in a graphite crucible. Pellets were arc ignited using graphite electrode. The reaction was complete in 30 seconds. Product was leached with 20% strength phosphsphoric acid solution in water.

Result: Here the product has $ZrB_2$ and MgO with almost negligible amount of $Mg3(BO_3)_2$. After leaching with phosphoric acid only zirconium diboride peaks were detected through XRD.

EXAMPLE 4

$ZrCl_4$=10 gms
Mg=15 gms
$H_3BO_3$=15 gms

All above materials were milled for four hours for proper mixing. The mixture was pelletised into 15 mm diameter cylinder of height 25 mm. Pellet were kept in a reaction chamber in argon atmosphere in a graphite crucible. Pellets were arc ignited using graphite electrode. The reaction was complete in 30 seconds. Product was leached with 20% strength phosphoric acid solution in water.

Result: Here the product has $ZrB_2$ and MgO with almost negligible amount of $Mg_3(BO_3)_2$. After leaching with phosphoric acid only Zirconium Diboride peaks were detected through XRD.

Main Advantages of the Present Invention are:
1. The present invention uses cheaper raw materials viz. zirconium chloride, boric acid and magnesium turnings compared to elemental zirconium and boron used by the known processes.
2. The present invention does not require any high temperature furnace as used by the known processes.
3. The present invention time consumption is very less compared to other known process.
4. The present invention is cost and energy effective compared to known processes.

We claim:

1. A process for the production of zirconium boride, which comprises mixing powders of zirconium chloride in the range of 20–25% wt, Boric acid ($H_3BO_3$) in the range of 35–44 wt % and small cut turnings Magnesium (Mg) in the range of 33–40 wt % and pelletising the mixture so prepared, igniting the prepared pellets under inert atmosphere and leaching the resultant product ($ZrB_2$ and MgO) with leachant to obtain zirconium boride.

2. A process as claimed in claim 1 wherein the zirconium chloride, boric acid and magnesium are milled prior to mixing.

3. A process as claimed in claim 1 wherein the resulting mixture after ignition is leached with a leachant comprising phosphoric acid.

4. A process as claimed in claim 1 wherein the zirconium chloride, boric acid and magnesium used as raw materials are of commercial grade.

5. A process as claimed in claim 1 wherein the reaction time is in the range of 1 to 2 minutes.

6. A process as claimed in claim 1 wherein the product zirconium boride is of purity of 95% and above.

* * * * *